United States Patent
Ford et al.

(10) Patent No.: US 6,783,041 B2
(45) Date of Patent: Aug. 31, 2004

(54) AUTOMOTIVE VEHICLE BICYCLE RACK HAVING LOAD ASSIST APPARATUS

(75) Inventors: Michael Ford, Ypsilanti, MI (US); Noah Barlow Mass, Ann Arbor, MI (US); Noel Ranka, Canton, MI (US); Travis Steven Garland, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 10/248,103

(22) Filed: Dec. 18, 2002

(65) Prior Publication Data

US 2004/0118884 A1 Jun. 24, 2004

(51) Int. Cl.[7] .............................. B60R 9/06; B60R 9/08
(52) U.S. Cl. ...................... 224/536; 224/310; 224/324; 224/537; 224/924
(58) Field of Search .................................. 224/310, 319, 224/324, 534, 536, 537, 924; 280/769; 414/462

(56) References Cited

U.S. PATENT DOCUMENTS

| | | | | |
|---|---|---|---|---|
| 3,563,430 A | * | 2/1971 | Forrest | 224/255 |
| 4,702,401 A | * | 10/1987 | Graber et al. | 224/536 |
| 4,740,538 A | * | 4/1988 | Sekutowski | 523/205 |
| 5,052,605 A | * | 10/1991 | Johansson | 224/324 |
| 5,690,259 A | * | 11/1997 | Montani | 224/310 |
| 6,089,430 A | * | 7/2000 | Mehls | 224/537 |
| 6,283,310 B1 | * | 9/2001 | Dean et al. | 224/924 |
| 6,308,874 B1 | | 10/2001 | Kim et al. | 224/310 |
| 6,454,147 B1 | * | 9/2002 | Marks | 224/268 |

* cited by examiner

Primary Examiner—Gary E. Elkins
(74) Attorney, Agent, or Firm—Gigette M. Bejin

(57) ABSTRACT

An apparatus to assist an operator in loading a bicycle onto a substantially vertical bicycle rack attached to an automotive vehicle, includes a base that attaches to the upper portion of the bicycle rack, and a substantially U-shaped hook, having one end that pivots at its base end and having another end that engages the inner rim portion of bicycle wheel when the bicycle is lifted into the proximity of the upper portion of the bicycle rack. The present apparatus and method of loading of a bicycle assists an operator in loading a bicycle by fully supporting the weight of the bicycle while the operator positions and secures the bicycle to the bicycle rack for transport.

12 Claims, 4 Drawing Sheets

AUTOMOTIVE VEHICLE BICYCLE RACK HAVING LOAD ASSIST APPARATUS

BACKGROUND OF INVENTION

1. Field of the Invention

The present invention relates to a bicycle rack having an apparatus for assisting an operator in loading a bicycle onto the rack when it is attached to the rear of an automotive vehicle.

2. Disclosure Information

When transporting bicycles by automobile, a bicycle is ordinarily supported either by a bicycle rack on the roof of the automobile or by a bicycle rack attached above or adjacent to the rear bumper of the automobile. Roof-mounted bicycle rack systems allow unhindered access to the rear of the vehicle and can generally accommodate several bicycles. However, roof-mounted bicycle rack systems require substantial operator effort to load and secure the bicycles. Rear-mounted bicycle rack systems are substantially easier to load, but may hinder or prevent rear access to the vehicle, interfere with trailer towing, or accommodate fewer bicycles than roof rack systems.

U.S. Pat. No. 6,308,874 illustrates a roof rack system for an automotive vehicle that is movable from a substantially horizontal position on the roof to a substantially vertical position along the rear of the vehicle. Roof-mounted bike rack systems now available can be readily adapted to the substantially vertical rack system described by the '874 patent. Loading and securing a bicycle onto a vertical rack requires significant effort and coordination, however, because the operator must hold the weight of the bicycle up while securing the wheels and frame to the bicycle rack. The apparatus and method described by the present invention assists an operator in loading a bicycle onto a vertical bicycle rack by bearing the weight of the bicycle during loading.

SUMMARY OF INVENTION

According to the present invention, an apparatus and method provides assistance for loading a bicycle onto a substantially vertical exterior bicycle rack on an automotive vehicle. The apparatus attaches to the upper portion of a bicycle rack and includes a hook extending from a base and around a wheel carriage channel to a position enabling engagement of a bicycle wheel. An operator can advantageously use the apparatus by lifting the bicycle into the proximity of the wheel carriage channel, engaging the hook of the bicycle loading apparatus around one of the bicycle's wheel rims, releasing the bicycle so that the weight of the bicycle is transferred to the hook of the loading apparatus, then further securing the bicycle to the rack for transit. The present invention greatly reduces the effort involved in loading a bicycle onto a vertical bicycle rack, promotes more secure attachment by freeing the operator to use two hands, and helps prevent damage to the bicycle and the vehicle during loading.

Other advantages, as well as the features and objects of the present invention, will become apparent to the reader of this specification.

DETAILED DESCRIPTION

Figure 1:
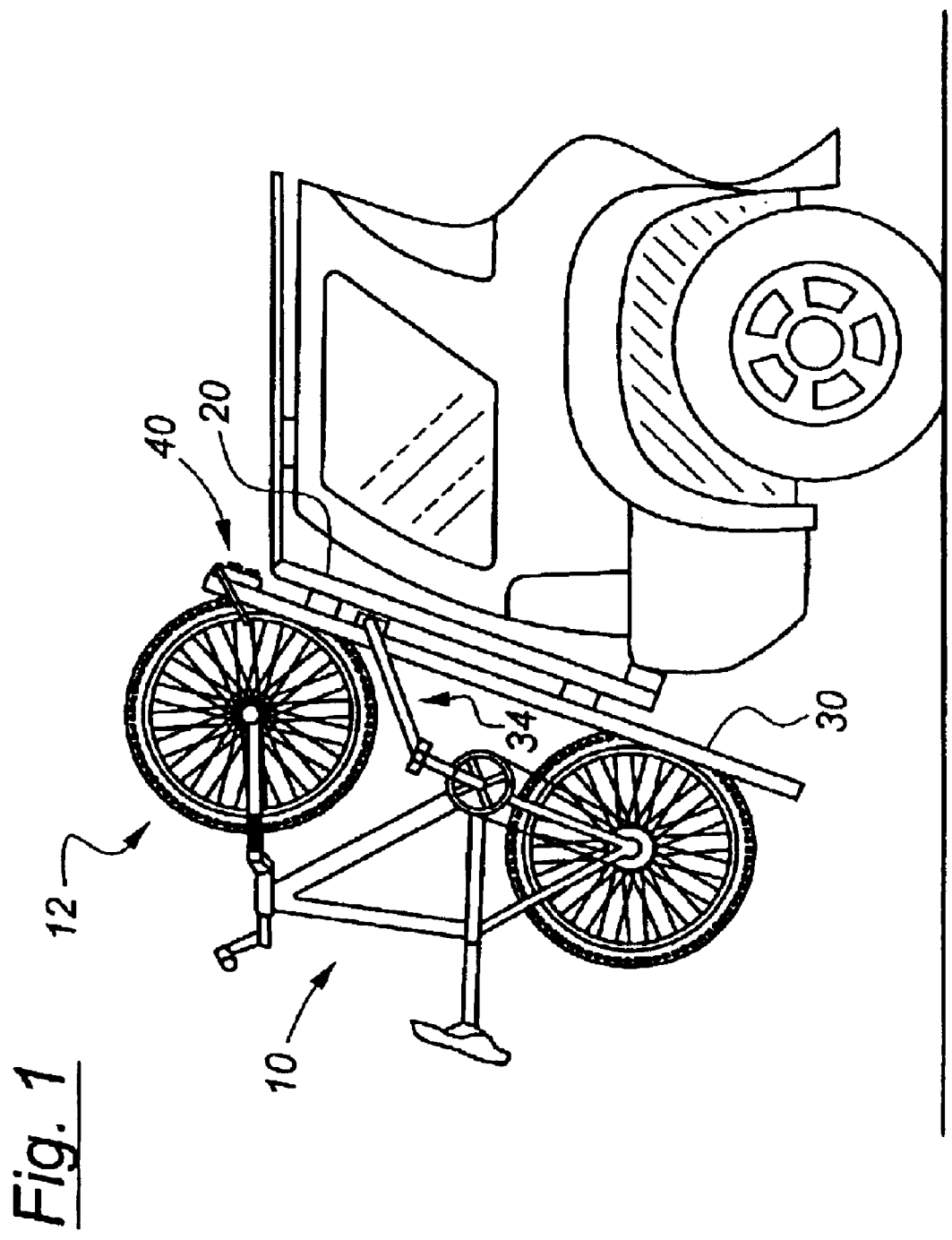
FIG. 1 is a drawing of a bicycle loading apparatus installed on a substantially vertical bicycle rack and supporting a loaded bicycle.

As shown in FIG. 1, a bicycle load assist apparatus 40 is attached to the upper portion of a bicycle rack 30, which is in turn attached to a substantially vertical roof rack system 20. During loading, the apparatus supports substantially all of the weight of a bicycle 10.

Figure 2:
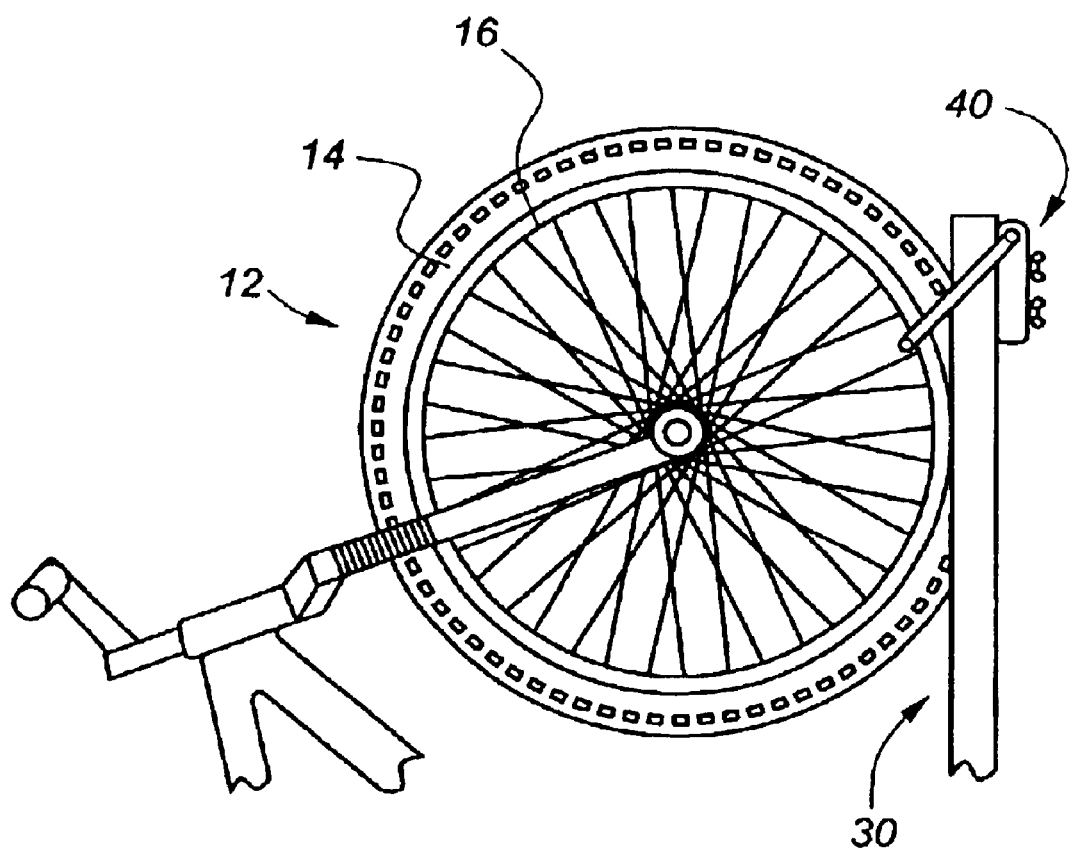
FIG. 2 is a side view of the apparatus shown attached to a wheel carriage channel and supporting a bicycle wheel.
Figure 3:
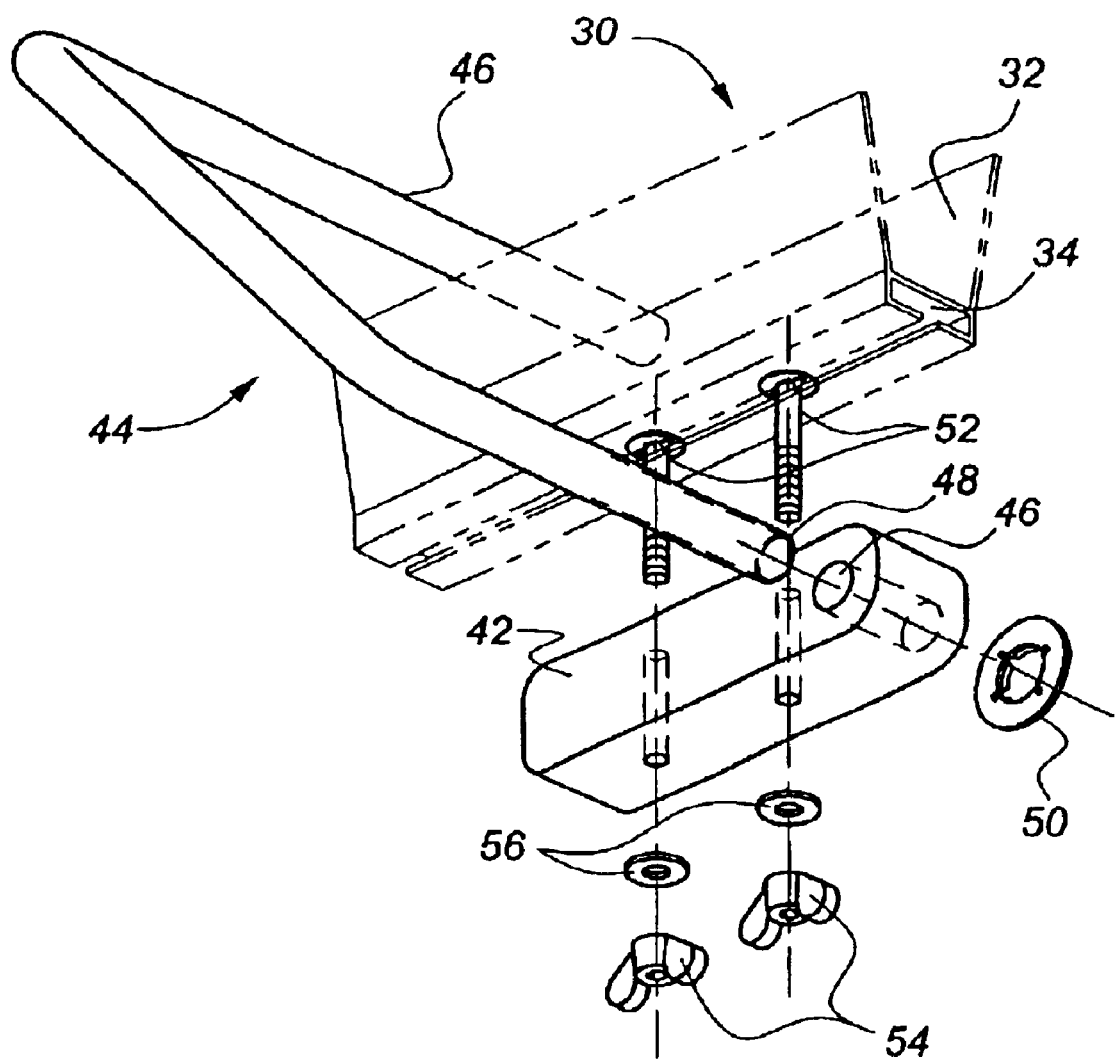
FIG. 3 is an exploded perspective illustrating the parts of a bicycle loading apparatus and showing a means for attaching the apparatus to a typical bike rack.
Figure 4:
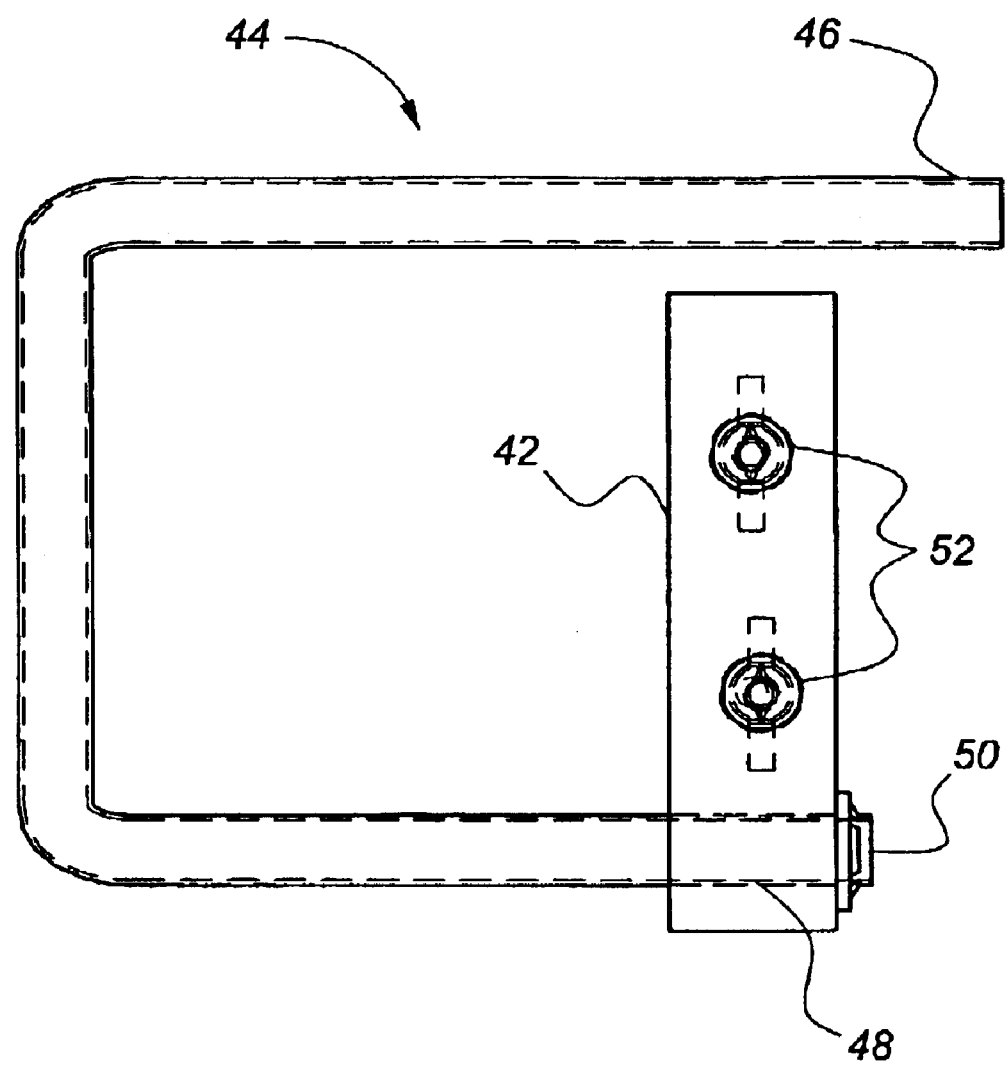
FIG. 4 is a top view of a bicycle loading apparatus according to the present invention.

As shown in FIGS. 2 and 3, base 42 of the bicycle loading apparatus attaches to the underside of the bicycle rack 30. A substantially U-shaped hook extends from the base and around bicycle rack 30. To load a bicycle using the invention, an operator lifts a bicycle from the ground and into the proximity of a V-shaped wheel carriage channel 32 of the bicycle rack, then engages hook 44 around a bicycle wheel 12, then releases the bicycle so that the weight of the bicycle is supported by hook 44.

The present invention contemplates that hook 44 will be comprised of a solid or tubular piece of cast or formed metal, such as aluminum, and that base 42 will comprise an injection-molded glass-filled nylon composite. The hook may be comprised of other materials, such as forged or composite materials. Similarly, the base may be comprised of metal, plastic, fiberglass, wood, or composite materials. As shown in FIG. 3, base end 48 of hook 44 inserts through a cylindrical hook hole 46 formed within the base allowing hook 44 to pivot. It is contemplated that friction between base end 48 and hook hole 46 will prevent rotation absent external force, thus permitting an operator to optimally position the hook to engage a bicycle wheel rim 16 during loading. The hook may be secured to the base by a variety of means, including inserting the base end of the hook 48 completely through hook hole 46 and capping the base end with an end cap 50. Base end 48 could also be inserted through hook hole 46 and then deformed to prevent the hook from detaching from the base, or could be threaded and secured by a nut. Those skilled in the art will appreciate in view of this disclosure, that base end 48 could be secured to base 42 through other techniques, including attaching base 42 end to the outside surface of base 42, or configuring base end 48 and hook hole 46 in such a way and with such dimensions as to prevent hook 44 from slipping out of base 42 during normal use. This is a matter of design choice commended to those wishing to devise and apparatus according to the present invention.

As shown in FIG. 3, bicycle rack 30 may be comprised of a V-shaped wheel carriage channel 32, in which bicycle tire 14 rests. Channel 32 further comprises bolt head channel 34. Loading apparatus base 42 may be attached to bicycle rack 30 by means of one or more attachment bolts 52 extending from the bolt head channel 34 through base 42 and secured at their threaded end by attachment washers 56 and attachment nuts 54. A multitude of attachment mechanisms could be utilized in lieu of attachment bolts to secure the base to the bicycle rack. Examples of other attachment mechanisms include a clamp, or an I-shaped flange secured to the top of base 42 that slideably inserts into bolt head channel 34.

After using the loading assist apparatus, an operator would secure both bicycle wheels 12 to bicycle rack 30 by means of clamps or tie-down straps, and then further secure and stabilize the bicycle to prevent side-to-side movement through use of a lateral stabilizer. FIG. 1 shows a stabilizer 34 extending from bicycle rack 30 to a foot pedal crank of bicycle 10. As those skilled in the art will appreciate, a variety of devices could be employed to stabilize lateral movement and further secure the bicycle to the bicycle rack or to the roof rack system. Lateral stabilizers typically used for roof-mounted systems and adaptable for use in a vertical rack system include flexible straps or cables and rigid supports extending from the bicycle rack to the bicycle frame.

Although the present invention has been described in connection with particular embodiments thereof, it is to be understood that various modifications, alterations and adaptations may be made by those skilled in the art without departing from the spirit and scope of the invention. It is intended that the invention be limited only by the claims.

What is claimed is:

1. A bicycle rack having a bicycle loading apparatus, comprising:
    a substantially vertical bicycle rack adapted for attachment to an automotive vehicle;
    a base for a hook;
    a hook having a base end attached to said base, wherein said hook rotates about its base end and about a generally horizontal axis within a cylindrical hook hole in the base, with the base end and the hole being sized to cause friction that impedes the hook from rotating absent an external force;
    a rim rest end of the hook adapted to engage an inner portion of a bicycle wheel rim to hold up a bicycle during bicycle loading; and
    an attachment mechanism that secures the base to a substantially vertical bicycle wheel carriage channel incorporated in said bicycle rack.

2. A bicycle rack according to claim 1, wherein the horizontal axis of hook rotation is transverse to the direction of vehicle travel.

3. A bicycle rack according to claim 2, wherein the horizontal axis extends through said base.

4. A bicycle rack according to claim 3, wherein said hook is substantially U-shaped.

5. A bicycle rack according to claim 4, wherein said base comprises an injection-molded glass-filled nylon composite.

6. A bicycle rack according to claim 5, wherein said hook is formed from a metallic material.

7. A bicycle rack according to claim 6, wherein the hook is tubular.

8. A bicycle rack according to claim 6, wherein the hook is solid.

9. A bicycle rack according to claim 6, wherein the hook comprises aluminum.

10. A bicycle rack for an automotive vehicle, with said rack comprising: a bicycle rack, adapted for attachment to an automotive vehicle, in a substantially vertical orientation; a base for a hook, with said base comprised of a composite material and having a cylindrical hook hole that is generally horizontal and substantially transverse to the direction of vehicle travel; a substantially U-shaped hook; a base end of said hook that rotates about a horizontal axis within said cylindrical hook hole, with the base end and the hole being sized to cause friction that impedes the hook from rotating absent an external force; a rim rest end of said hook that during bicycle loading engages an inner portion of a bicycle wheel rim to hold said bicycle wheel up and within a wheel carriage channel incorporated in said bicycle rack; an attachment mechanism comprising one or more fasteners extending from the underside of said wheel carriage channel and attaching to the base; and a lateral stabilizer mechanism that prevents excessive lateral movement of the bicycle during transit.

11. A bicycle rack according to claim 10, wherein said base comprises an injection-molded glass-filled nylon composite.

12. A bicycle rack according to claim 10, wherein said hook is comprised of tubular aluminum.

\* \* \* \* \*